(12) United States Patent
Sauer

(10) Patent No.: US 6,787,750 B1
(45) Date of Patent: Sep. 7, 2004

(54) METHOD AND APPARATUS FOR ROBUST OPTICAL TRACKING WITH BEACON MARKERS

(75) Inventor: Frank Sauer, Princeton, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 468 days.

(21) Appl. No.: 09/607,116

(22) Filed: Jun. 29, 2000

(51) Int. Cl.⁷ .............................................. H01L 27/00
(52) U.S. Cl. ................................ 250/208.1; 250/559.4
(58) Field of Search ............................ 250/208.1, 221, 250/559.4, 559.44; 382/294, 295, 154; 348/222.1, 231.2

(56) References Cited

U.S. PATENT DOCUMENTS 6,571,024 B1 * 5/2003 Sawhney et al. ........... 382/294

* cited by examiner

*Primary Examiner*—Que T. Le

(57) ABSTRACT

A method for optical tracking in a video sequence comprises the steps of placing optical markers in a 3-dimensional scene for viewing by a camera from a given camera pose. Certain preselected markers are designated optical beacons and are configured for ready location of images thereof in an image of the camera. Others of the markers are placed in positions having known relative spatial relationship to the optical beacons. Images of the optical beacons are found in the image. Images of a plurality of others of the optical markers are found by using existing knowledge of their relationship to the beacons, optionally via an approximate camera pose corresponding thereto that is derived from the image information, precise locations of optical markers are obtained, and information of the precise locations of optical markers is uses to obtain a precise camera pose.

20 Claims, 3 Drawing Sheets simple example for beacon line marker

Figures
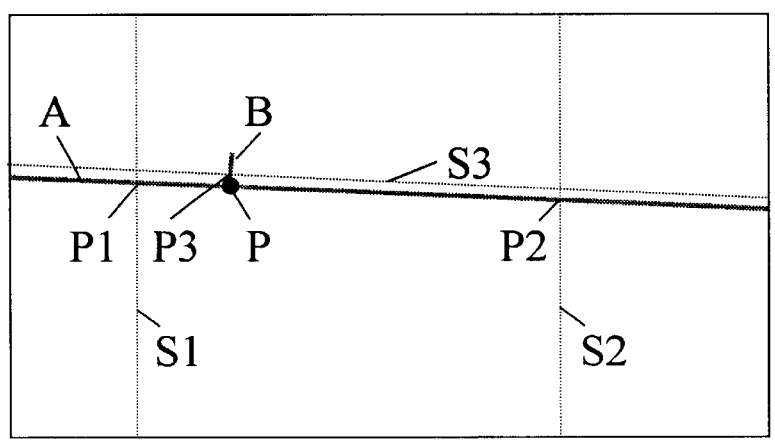
Figure 1: simple example for beacon line marker
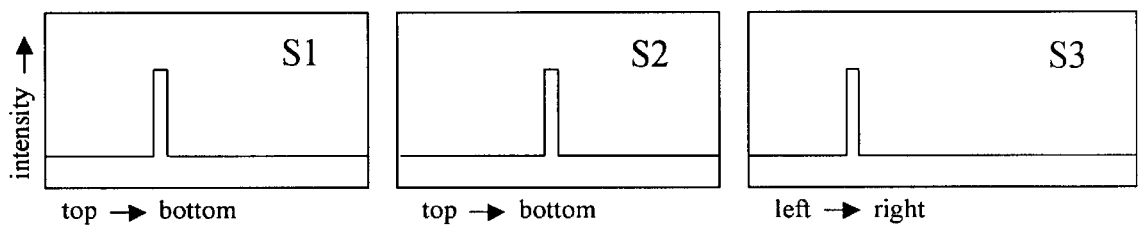
Figure 2: linescans S1, S2, S3

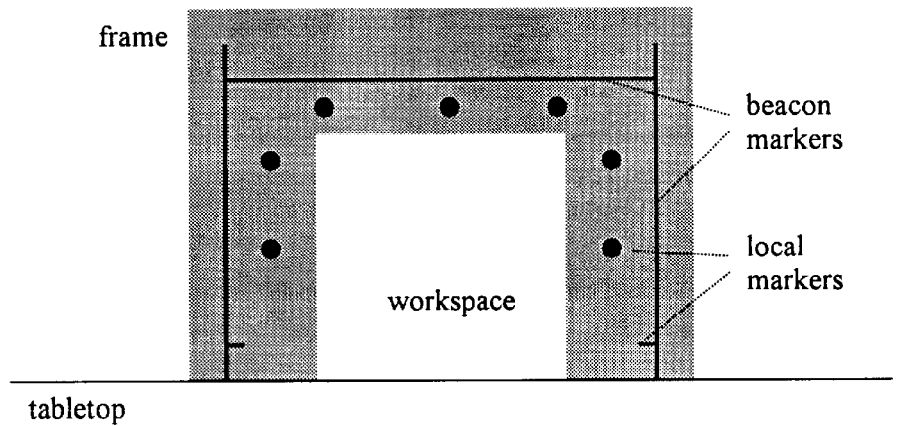
Figure 3: possible marker design for framed workspace case
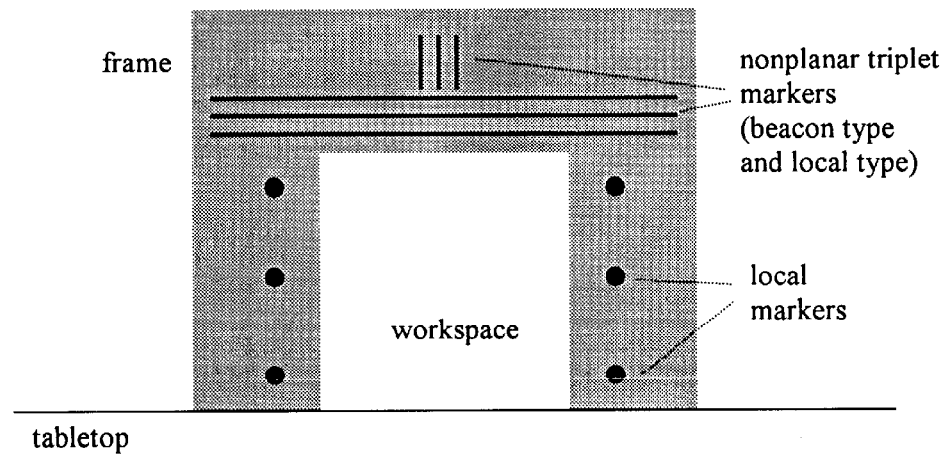
Figure 4: another possible marker design for framed workspace case with nonplanar triplets

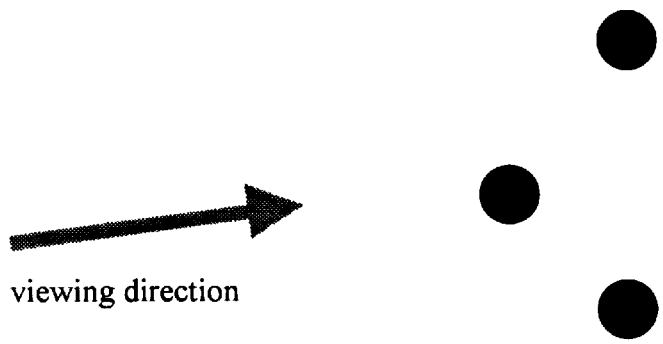
*Figure 5: side view of nonplanar triplet markers, here shown with round cross sections. Cross sections could also be flat.*

METHOD AND APPARATUS FOR ROBUST OPTICAL TRACKING WITH BEACON MARKERS

The present invention relates to optical markers and, more specifically to tracking optical markers in a video sequence.

With regard to the concept of beacon markers and by way of background it is noted that the optical markers are visible structures with known positions in a 3-dimensional world. It is herein recognized that by identifying and localizing such markers in video frames, one can calculate the corresponding poses of a video camera having known internal camera parameters. The camera pose contains six parameters, corresponding to three translational and three rotational degrees of freedom.

A 3-dimensional computer generated models can be designed to exhibit geometric attributes of a real object as they would appear to a "virtual observer" located at a "virtual viewpoint".

Knowledge of the camera pose allows one, for example, to render 3-dimensional computer generated models onto the video sequence such that the virtual viewpoint of these models is matched to the "real" viewpoint of the video camera. The computer models then appear from the viewpoint of the video camera as an integral part of a 3-dimensional scene.

The achievement of optical marker tracking in real time presents certain difficulties, as will be explained. Real time tracking is usually performed in two phases: first, an initialization phase, where the whole video frame is searched for the markers and the initial marker locations are determined and, second, an actual real time tracking phase wherein the marker locations are constantly updated, taking their previous locations into account. The neighborhood of an old marker location is searched to find the new marker location. At present, standard computers do not provide sufficiently fast computation to allow one to search through the full video frames in real time, typically at 25 or 30 frames per second.

The real time tracking phase is inherently non-robust. A sudden sharp movement or jolt of the camera may displace the markers in the video frame to the extent that they "fall" outside their search windows, whereupon the system then loses track of the markers, requiring a new initialization phase.

To improve the robustness of optical tracking systems, it has been proposed to supplement them with non-optical, e.g. magnetical trackers. See, for example: State, Andrei, Gentaro Hirota, David T. Chen, William F. Garrett, and Mark A. Livingston. "Superior Augmented-Reality Registration by Integrating Landmark Tracking and Magnetic Tracking." Proceedings of SIGGRAPH 96. (New Orleans, La., Aug. 4–9, 1996); Computer Graphics Proceedings, Annual Conference Series 1996, ACM SIGGRAPH, pgs. 429–438.

It is herein recognized that such a hybrid tracking system would use the non-optical tracker to give a robust, yet not very precise estimate of the camera pose, while the optical tracker would refine this estimate and yield the marker locations with improved precision. The robustness of the hybrid system comes at the price of increased cost and complexity of the system.

In accordance with an aspect of the invention, a method for optical tracking in a video sequence comprises the steps of placing optical markers in a 3-dimensional scene for viewing by a camera from a given camera pose. Certain preselected markers are designated optical beacons and are configured for ready location of images thereof in an image of the camera.

In accordance with an aspect of the invention, others of the markers are placed in positions having known relative spatial relationship to the optical beacons. Images of the optical beacons are found in the image. Images of a plurality of others of the optical markers are found by using existing knowledge of their relationship to the beacons, optionally via an approximate camera pose corresponding thereto that is derived from the image information, precise locations of optical markers are obtained, and information of the precise locations of optical markers is uses to obtain a precise camera pose.

The invention will be better understood from the detailed description of preferred embodiments which follows, in conjunction with the Drawing, in which FIG. 1 shows an example of a beacon line marker in accordance with the principles of the invention;

FIG. 2 shows linescans, S1, S2, S3, in accordance with the principles of the invention;

FIG. 3 shows a possible marker configuration on a frame, in accordance with the principles of the invention;

FIG. 4 shows another possible marker configuration on a frame, in a case with nonplanar triplets in accordance with the principles of the invention;

FIG. 5 shows a side view of nonplanar triplet markers in accordance with the principles of the invention, here shown with round cross sections: the cross sections could also be flat; and In accordance with an aspect of the present invention, optical beacons are utilized for a robust tracking solution that is purely optical. Optical beacons are optical markers that can be easily and quickly found in the video frame without the need for any knowledge of the previous camera pose.

With the beacons having been found, one is guided to additional optical markers in the video frame and/or one is able to calculate an approximate camera pose. Given the approximate camera pose, one can estimate the location of the remaining optical markers in the video frame and find them quickly. Obtaining the precise locations of these other markers makes it possible to calculate a precise result for the camera pose.

With optical beacons, each video frame is processed without using knowledge of the marker locations on previous frames. The optical beacons allow a quick and approximate camera pose determination and additional optical markers allow one to improve the accuracy of this first estimate. Hence, the method in a accordance with the invention is purely optical, and is robust and precise.

The proper design of optical beacons involves certain careful considerations. Their size and distribution depend on the allowed range of camera poses, and search algorithms have to be devised according to the structure and distribution of the optical beacons. The concept of beacon markers in accordance with the principles of the invention will next be described by way of a preferred exemplary embodiment.

One has to be able to find a beacon marker very quickly in a video frame. That indicates that the beacon marker should be rather large. However, a beacon marker that simply occupies a large area, or large volume in real space, may not be practicable. First, it may get in the way of other objects in the scene or it may itself get partially occluded by other objects. Second, to estimate the position of the large marker may require that a relatively large area of the video frame be processed, which is time-consuming.

In accordance with an aspect of the present invention, beacon markers are utilized that extend only in one dimension, that is, the beacons are essentially in the form of a stripe. An exemplary embodiment illustrated in FIG. 1 shows a video frame where it is desired to locate the point P. To find point P quickly it is marked as the intersection between the beacon line A and the short marker line B. Beacon line A extends over the whole width of the video frame in an approximately horizontal direction. Line A can easily be located by performing two vertical line scans S1 and S2 that detect the intersection points P1 and P2. Now one can perform a linear scan S3 parallel and close to line A that will yield the intersection P3 with the short marker line B. Point P can then be calculated by projecting P3 onto the line P1–P2. Note that line B could also be extended over the whole height of the video frame, but that is not necessary.

If point P were to be marked only locally with a small disc, one would have to scan through the whole video frame, for example, g. line by line, until one finds it. The beacon line marker in accordance with the principles of the present invention, in contrast, allows a very fast search algorithm.

The line scans S1, S2, and S3 provide one-dimensional intensity profiles. FIG. 2 shows how they allow one to locate the intersection with the markers. In FIG. 2 the markers are shown to have higher intensity, that is, they are brighter than the background. It is also contemplated that markers could also be dark on a bright background, as shown in FIG. 1. In practical applications, the background may generally not be as uniform as shown in the present exemplary embodiment. In case a line scan "hits" other features and one is not able to identify the intersection with the marker one is looking for, additional line scans parallel to the first one need to be performed to collect more information.

As stated, the background in a practical application may not be as uniform as that shown in FIGS. 1 and 2. In accordance with the principles of the present invention, active infrared markers or retroreflective passive markers may be used in conjunction with infrared illumination together with a camera that has an infrared filter such as an infrared bandpass filter to block out the visible spectrum of the light. The video image thus obtained in accordance with the invention accordingly contains essentially only the marker structures whereby the marker detection is simplified.

Generally, a complete camera pose determination is associated with a requirement for a plurality of markers. In FIG. 1, point P was found as intersection of the beacon marker A and the marker B. The location of point P's image and line A's image are not yet sufficient to calculate the camera pose. At least three points or three lines, or a combination thereof, is needed to be able to calculate the camera pose. More precisely: one needs the correspondence between three points, or lines, with known positions in the 3-dimensional world and the locations of their projected images in the video frame. Nevertheless, the solution is not unique. Practical algorithms use four or more points, lines, or cylinders, whereby the greater number of points provides the added benefit of increasing the accuracy of the results.

In principle, all points/lines could be directly connected to beacon markers as in FIG. 1. The more striped beacons there are, however, the more difficult it will be to identify them individually. Marker identification methods in accordance with the principles of the present invention include the following:

color coding: one marker is for example yellow, the other red;

"bar" coding, that is, spatial coding, such as the use a single stripe and a double stripe, for example;

reasoning based on relative location of beacons and/or on limited range of camera poses:

if there are, for example, two horizontal beacons and both are detected in the image, and it is known that the camera is always "heads up" (i.e. it is never turned upside down), then one can establish a unique correspondence between the two beacons in the image and in the 3-D scene; and selective triggering, when active markers are used.

A crowded marker "landscape" may not be desirable; for example, for the sake of appearance, such as for esthetic reasons. It may also be difficult to place many beacon markers in a way that occlusion of the markers does not become a problem. And markers should also not get into the way of whatever action may have to be performed in the scene. Furthermore, as noted before, identification of the beacon markers becomes more difficult the more beacon markers there are.

A "minimal" design is achievable by combining global beacon markers with local markers. An appropriate strategy in accordance with the invention is to use only one or a few beacon markers. The beacon markers need to have a "global" presence so that they can be detected easily and fast. "Local" markers are added that allow one to determine the camera pose uniquely and with sufficient accuracy. In FIG. 1 for example, line A is a global beacon marker, line B is a local marker.

The global beacon markers serve as guides to find the local markers, either directly in the image or via an initial camera pose estimation. In accordance with the principles of the present invention, this may be accomplished directly in the image or via an initial camera pose estimation, as will next be described.

Directly in the image: Local markers are placed relative to the global beacons so that they can be found easily once the beacons have been found. In FIG. 1, marker B is located easily by scanning along the upper neighborhood of A, with the assumption that the camera has not been turned upside down. A single beacon can be used to mark several points. One can, for example, add a second marker line B' in FIG. 1 to define a point P' as the intersection of A and B'. Local structures can also be placed in the neighborhood of the global structures without intersecting them, or local structures can be placed relative to more than one global structure such as, for example, midway between two parallel beacon lines).

Via an initial camera pose estimation: First one localizes enough markers in the image to allow a calculation of the camera pose. Additional markers that are present in the 3-D scene but have yet not been found in the image, can be efficiently be located by estimating their position in the image based on the estimated camera pose, and then start a search for them around these positions.

By way of further example, consider the following case: it is desired to calculate the position of a camera, such as a video camera, relative to a frame. The marker distribution on the frame is designed in accordance with the principles of the present invention based on the concept of beacon markers.

FIG. 3 shows a possible marker configuration where all the markers are in one plane. The field of view of the camera should be large enough so that the three beacon markers are seen in the image for all desired camera poses. The horizontal and the two parallel vertical beacon markers can be located very fast with a few line scans. The left vertical marker can be identified by the fact that the horizontal marker is located to its right, and vice versa for the right vertical marker (assuming that the range of permitted camera poses does not include turning the camera upside down).

Local markers are added with known (previously measured) 3D locations. An appropriate configuration is shown in FIG. 3.

Steps in accordance with the present invention for using the beacon markers as guidelines to find the local markers in FIG. 3 are set forth below.

Find the top guideline
  perform vertical line scan in the middle of the image, starting from top, comparing the pixel intensities to a certain threshold value
  potential guideline found if pixel intensity is above threshold value
  check if it really is the top guideline and not just a marker, a vertical guideline, or any other spot of higher intensity: "walk" inside the higher intensity area to test its extension; if it is extended more than a given size parameter, it is considered to be a guideline (markers are smaller in size), if it is inclined towards the horizontal direction by not more than 45°, it is considered to be the top guideline (not one of the side guidelines)
  if no top guideline was found with a vertical line scan at the present horizontal location, other line vertical scans left and right of the current position are performed; either until the top guideline is found, or until the whole width of the image has been unsuccessfully searched
Find the markers along the top guideline, once it has been found
  "walk" along the guideline, first left, then right, until the horizontal ends of the guideline
  at each step of the walk, search below the guideline for markers by performing a local vertical line scan below the guideline over a limited range (the step size for the walk along the guideline and the step size of the local vertical line scan have to be adjusted such that the search points are close enough not to miss the markers)
  a potential marker is found if pixel intensity is above threshold value
  get confidence that it really is a marker by determining spatial extent; markers have a certain size range in the image
  in this way, all the markers along the top guideline can be found (provided they appear in the image)
Finding left and right guidelines
  procedure similar to finding top guideline; for a left guideline, a horizontal line scan is now performed, starting from the left edge of the image until the horizontal position given by the horizontal center of the top guideline is reached; for the right guideline, a horizontal line scan is performed starting from the right side of the image until the same horizontal position given by the center of the top guideline is reached.
Finding the markers along left and right guidelines
  a search is now performed to the right of the left guideline and to the left of the right guideline until all the markers (that are present in the image) are found; the process is analogous to the one where a search is conducted for the markers alongside the top guideline FIG. 4 shows a different possible marker configuration, this time using two sets of nonplanar stripe or cylinder triplets (one global triplet, one local triplet). FIG. 5 shows how a triplet with round cross-sections would look from the side. The markers could as well have flat cross sections. The triplets should be designed and placed in a way that for all valid camera poses the image of the middle cylinder, that being closest to the user, appears between the images of the two outer cylinders, which are the farthest away from the user. The position of the triplets and the relative displacement of the central component of the triplet allow one to calculate the camera pose. For accuracy reasons, however, it may be desirable to add additional local markers as in the marker configuration of FIG. 3.

So far, beacon markers have been considered as global markers, extending in one dimension across the whole image. They can thus be easily and quickly "picked up" by simple one-dimensional scans. However, this is not the only possible way to establish certain markers as "beacons" in accordance with the present invention.

Consider a small marker that is brighter than the rest of the image. If we had a vertical and a horizontal projection of the image, we could easily and quickly pick out the vertical and horizontal coordinates of this bright marker. To get the projections, however, we would have to perform line scans and sums over all rows and over all columns of the image. That is computationally expensive if performed in software. But it is possible to implement these operations in electronic hardware, in such a way that they would be performed in real time. If the computer program used receives not only the video frames but also their vertical and horizontal projections as inputs, local beacon markers are usable. In the same way as global beacons, different local beacons may be distinguished by their intensity, spatial patterns, colors, and so forth.

The requirement in regard to the availability of image projection information can then be relaxed: it would suffice to have either the vertical or the horizontal projection available. For example, if we know only the vertical projection, we know the horizontal coordinate of the beacon marker. Performing a vertical line scan at this horizontal location will then directly lead to the detection of the marker's vertical coordinate.

The processing includes finding and identifying the markers in the image, where the concept of beacon markers helps, calculating the precise 2D marker locations in the image, creating a list of 2D–3D point correspondences, and calculating the camera pose based on the list of point correspondences. In a prior calibration step, one needs to determine the 3D coordinates of the markers and the internal camera parameters of the camera.

Calibration

Calibration of the system is necessary to use it for real time camera pose estimation.

We need to measure the 3D coordinates of the markers. That can be done, for example, with a commercial measurement system like Optotrak® system from Northern Digital Inc. or FaroArm® from Faro Technologies Inc.

Furthermore, it is also necessary to determine the internal parameters of the camera. One can create a calibration object (set of markers) and base the camera calibration on 3D–2D point correspondences. The 3D coordinates of the markers can be known from a precision fabrication of the object or they can be measured with a commercial measurement system like Optotrak® system from Northern Digital Inc. or FaroArm® from Faro Technologies Inc. The 2D positions are determined from the images taken with the camera. One can follow Tsai's calibration algorithm, benefiting from an implementation that is available as freeware at http://www.cs.cmu.edu/~cil/v-source.html.

The following steps have to be performed for the camera calibration:
- capture a video image that shows the calibration object with known 3D marker coordinates;
- find the markers in the image;
- determine the 2D coordinates of the marker centers (in the case of disc or ball shaped markers) seen in the image;
- establish a correspondence between the 3D and the 2D marker coordinates;
- feed this list of point correspondences into the calibration algorithm to calculate the internal camera parameters; and
- record the camera parameters for later use.

With regard to the step of determining the 2D coordinates of the marker centers seen in the image see, for example, Robert J. Valkenburg, Alan M. McIvor, and P. Wayne Power, "An evaluation of subpixel feature localisation methods for precision measurement," SPIE Vol. 23 50, Videometrics III (1994) pages 229–238.

With regard to the step of feeding this list of point correspondences into the calibration algorithm to calculate the internal camera parameters see, for example, Roger Y. Tsai, "An Efficient and Accurate Camera Calibration Technique for 3D Machine Vision", Proceedings of IEEE Conference on Computer Vision and Pattern Recognition, Miami Beach, Fla., 1986, pages 364–374, and Roger Y. Tsai, "A versatile Camera Calibration Technique for High-Accuracy 3D Machine Vision Metrology Using Off-the-Shelf TV Cameras and Lenses", IEEE Journal of Robotics and Automation, Vol. RA-3, No. 4, August 1987, pages 323–344.

Real time pose determination, similar to the initial system calibration, is based on a list of 2D–3D point correspondences. To achieve real time performance, one now evaluates the point correspondence list with the prior knowledge of the internal camera parameters, only calculating the external camera parameters (camera pose). The steps are the following:
- evaluate camera image to find markers (with known 3D coordinates), helped by beacon markers;
- determine the 2D coordinates of the marker centers seen in the image;
- establish correspondences between the 3D and the 2D marker coordinates, whereby beacon markers help to identify the markers.
- feed this list of point correspondences into the calibration algorithm to calculate the external camera parameters, making use of the known internal camera parameters Beacon markers help to identify the markers in the step above of establishing correspondences between the 3D and the 2D marker coordinates.

Thus, beacon markers are structures that can quickly and readily be found in an image. For that purpose, they are global structures, that is, elongated in one dimension. However, with adequate special purpose hardware that can calculate vertical and/or horizontal image projections in real time, local structures can also be used as beacons.

Beacons serve as guides to additional local marker structures, either directly in the image, or via an initial camera pose estimate.

Computational steps and procedures are intended to be performed preferably by a programmable digital computer.

It will be understood that the invention has been described by way of preferred exemplary embodiments. Various changes and modifications which will be apparent to one skill in the art to which it pertains and are contemplated to be within the spirit of the invention which is defined by the claims following.

What is claimed is:

1. A method for optical tracking in a video sequence, said method comprising the steps of:
   placing a plurality of optical markers in a three-dimensional space;
   storing location data for said plurality of optical markers in said three-dimensional space;
   viewing said three dimensional space with a camera in a given pose for forming a camera image thereof;
   identifying an image of one of said optical markers in said camera image, hereinafter referred to as a beacon marker;
   storing location information of said beacon marker;
   utilizing said location data, said location information, and predefined search criteria in said camera image for locating images of others of plurality of optical markers;
   storing respective location information for said images of said others of plurality of optical markers; and
   utilizing said location data, said location information, and said respective location information for said images of said others of plurality of optical markers to derive positional information for determining said given pose of said camera.

2. A method for optical tracking in a video sequence comprising the steps of:
   placing at least one optical marker of a first kind (beacon kind), which can be quickly and robustly detected in an image, in a three-dimensional space to be viewed by a camera in a given pose for forming a camera image thereof;
   placing a plurality of optical markers of a second kind in said three-dimensional space in known predetermined relationships with said at least one optical marker of said first kind and with known predetermined 3D coordinates;
   locating an image of said optical marker of a first kind in said image and storing positional parameters thereof;
   utilizing said positional parameters and said known predetermined relationships to locate respective images of said plurality of optical markers of a second kind;
   storing respective location information for said images of said others of plurality of optical markers; and
   utilizing said 3D coordinates, said location information, and said respective location information for said images of said others of plurality of optical markers to derive said given pose of said camera.

3. A method for optical tracking in a video sequence as recited in claim 2, wherein said steps of placing optical markers of first kind (beacon markers) comprise placing optical markers that essentially extend in one dimension.

4. A method for optical tracking in a video sequence as recited in claim 2, wherein said steps of placing beacon markers comprise placing optical markers that are essentially in the form of a stripe.

5. A method for optical tracking in a video sequence as recited in claim 2, wherein said optical markers of the second kind are local features of the optical markers of the first kind.

6. A method for optical tracking in a video sequence as recited in claim 4, comprising the steps of:
   placing beacon markers, at least one horizontal and at least two vertical, such that all of said beacon markers are in one plane and such that all are visible in said camera image for all desired camera poses;

locating said horizontal and said vertical beacon markers with a line scans.

7. A method for optical tracking in a video sequence as recited in claim 6, comprising the steps of:

adding local markers with predetermined known 3D locations.

8. A method for optical tracking in a video sequence as recited in claim 6, comprising the steps of:

finding a top horizontal marker;

performing a vertical line scan in the middle of the image, starting from top, comparing the pixel intensities to a predetermined threshold value, a potential guideline being found if pixel intensity is above said threshold value;

if no top guideline was found with a vertical line scan at the present horizontal location, then performing additional line vertical scans left and right of the current position;

repeating said additional line vertical scans until either a top guideline is found, or until the whole width of the image has been unsuccessfully searched; find the markers along said top guideline;

performing a "walk" along said top guideline, first left, then right, until the horizontal ends of said top guideline;

at each step of said walk, searching below said top guideline for markers by performing a local vertical line scan below said top guideline over a predetermined limited range, the step size for said walk the step size for said local vertical line scan being selected such that search points are close enough not to miss the markers; and determining that a potential marker is found if pixel intensity is above said threshold value.

9. A method for optical tracking in a video sequence as recited in claim 8, comprising the steps of:

verifying whether said potential guidline really is a top guideline and not just one of a marker, a vertical guideline, and any other spot of higher intensity by "walking" inside the higher intensity area to test its extension; and determining whether it is extended more than a predetermined size parameter and, if so, considering it to be a guideline, and if it is inclined towards the horizontal direction by not more than 45°, considering it to be the top guideline and not a side guideline.

10. A method for optical tracking in a video sequence as recited in claim 8, comprising the step of:

verifying that a found top guideline really is a marker by determining spatial extent in accordance with a predetermined permissible certain size range in said image, whereby all markers appearing in said image along said top guideline can be so found.

11. A method for optical tracking in a video sequence as recited in claim 10, comprising the steps of:

for each of left and right guide lines, performing a respective horizontal line scan, starting from the left and right edges respectively of said image until the horizontal position given by the horizontal center of said top guideline;

finding the markers along left and right guidelines; and searching to the right of said left guideline and to the left said right guideline until all markers present in said the image are found.

12. A method for optical tracking in a video sequence comprising the steps of:

placing optical markers in a 3-dimensional scene for viewing by a camera from a given camera pose, whereof certain preselected markers are designated optical beacons and being configured for ready location of images thereof in an image of said camera and others of said markers are placed in positions having known relative spatial relationship to said optical beacons and known 3D coordinates;

finding images of said optical beacons in said image;

finding images of a plurality of others of said optical markers by using existing knowledge of their relationship to said beacons;

obtaining precise locations of optical markers; and using information of said precise locations of optical markers in said image in conjunction with known 3D coordinates of said markers and known internal parameters of said camera to obtain a precise camera pose.

13. A method for optical tracking in a video sequence comprising the steps of:

placing optical markers in a 3-dimensional scene for viewing by a camera from a given camera pose, whereof certain preselected markers are designated optical beacons and being configured for ready location of images thereof in an image of said camera and others of said markers are placed in positions having known relative spatial relationship to said optical beacons and known 3-D coordinates;

finding images of said optical beacons in said image;

deriving from said image information on an approximate camera pose corresponding thereto;

finding images of a plurality of others of said optical markers based on an estimate of their positions in said image derived from said approximate camera pose in conjunction with known 3D coordinates of said optical markers and known internal parameters of said camera;

obtaining precise locations of optical markers; and using information of said precise locations of optical markers in said image in conjunction with known 3D coordinates of said markers and known internal parameters of said camera to obtain a precise camera pose.

14. Apparatus for optical tracking in a video sequence comprising:

a camera;

optical markers for placement in a 3-dimensional scene for viewing by said camera from a given camera pose, certain preselected markers being designated optical beacons and being configured for ready location of images thereof in an image of said camera and wherein others of said markers are placed in positions having known relative spatial relationship to said optical beacons, said beacons forming respective images in said image; and means for finding images of a plurality of others of said optical markers by using existing knowledge of their relationship to said beacons, for deriving from said image information on an approximate camera pose corresponding thereto, obtaining precise locations of optical markers, and for using information of said precise locations of optical markers to obtain a precise camera pose.

15. A method for finding and identifying optical markers in an image, said method comprising the steps of:

placing a plurality of optical markers in a three-dimensional space;

placing a plurality of optical beacon markers in the three-dimensional space which have particular spatial relationships with said optical markers;

viewing said three dimensional space with a camera in a given pose for forming a camera image thereof; and finding and identifying the locations of the beacon markers in said camera image; and utilizing said knowledge of the beacon marker locations in conjunction with said spatial relationship to find and identify the locations of said optical markers in said image.

16. A method for finding and identifying optical markers in an image as recited in claim 15, including the steps of:

selecting said spatial relationship between said optical markers and said optical beacon markers such that the locations of said optical beacon markers in said camera image allow the step of:

using said optical beacon markers as guides in said image to find and identify said optical markers.

17. A method for finding and identifying optical markers in an image as recited in claim 15, including the steps of:

selecting said spatial relationship between said optical beacon markers such that the positions of said optical beacon markers and said optical markers are pre-determined with respect to a three-dimensional coordinate system such as to permit:

finding the locations of said beacon markers in said camera image;

calculating, in conjunction with pre-determined internal camera parameters of said camera, an estimate of the pose of said camera with reference to said three-dimensional coordinate system;

utilizing said estimate of the pose of said camera to project the position of said optical markers onto said camera image as an estimate for the actual location of said optical markers in said image; and finding and identifying said images of said optical markers in said camera image in a close neighborhood of said estimated locations.

18. A method for finding and identifying optical markers in an image as recited in claim 15, wherein said image is an image in a video sequence.

19. A method for finding and identifying optical markers in an image as recited in claim 15, wherein said optical beacons essentially extend in one dimension.

20. A method for finding and identifying optical markers in an image as recited in claim 15, wherein said optical beacons are essentially in the form of one or more stripes.

* * * * *